(12) United States Patent
Line et al.

(10) Patent No.: US 10,427,724 B2
(45) Date of Patent: Oct. 1, 2019

(54) VEHICLE AND VEHICLE AIR COMPRESSOR SYSTEM

(71) Applicant: FORD GLOBAL TECHNOLOGIES, LLC, Dearborn, MI (US)

(72) Inventors: Johnathan Andrew Line, Northville, MI (US); Gregory Hagedorn, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/672,988

(22) Filed: Aug. 9, 2017

(65) Prior Publication Data

US 2019/0049132 A1   Feb. 14, 2019

(51) Int. Cl.
| | |
|---|---|
| *B62D 33/023* | (2006.01) |
| *B60P 7/08* | (2006.01) |
| *F15B 21/048* | (2019.01) |
| *B62D 63/04* | (2006.01) |
| *B60R 11/00* | (2006.01) |

(52) U.S. Cl.
CPC .......... *B62D 33/023* (2013.01); *B60P 7/0807* (2013.01); *B62D 63/04* (2013.01); *F15B 21/048* (2013.01); *B60R 2011/0061* (2013.01); *B60R 2011/0073* (2013.01); *B60R 2011/0075* (2013.01)

(58) Field of Classification Search
CPC ......... B60R 9/00; B60R 11/00; B62D 33/023; B62D 63/04; B62D 25/00; B62D 25/02; B60P 7/08
USPC .......................... 296/1.07; 137/869.4, 899.4
See application file for complete search history.

(56) References Cited

U.S. PATENT DOCUMENTS

| | | | |
|---|---|---|---|
| 6,082,408 A | 7/2000 | Werling et al. | |
| 7,117,896 B2* | 10/2006 | Eberling | B60T 17/06 137/899 |
| 7,431,368 B2* | 10/2008 | Henderson | B60R 5/00 296/37.6 |
| 7,611,185 B2* | 11/2009 | Allen | B60P 3/14 222/192 |
| 9,499,088 B1* | 11/2016 | Fenchak | B60P 7/0807 |

FOREIGN PATENT DOCUMENTS

| | | |
|---|---|---|
| CN | 105329107 A | 2/2016 |
| EP | 2987704 A2 | 2/2016 |

* cited by examiner

*Primary Examiner* — Jason S Daniels
(74) *Attorney, Agent, or Firm* — Vichit Chea; Brooks Kushman P.C.

(57) ABSTRACT

A vehicle includes a truck bed, docking plate, baseplate, latching system, air compressor, and air storage tank. The truck bed has a side panel extending upward from a floor panel. The docking plate is secured to an internal surface of the side panel. The baseplate has first and second opposing external surfaces. The latching system extends from the first surface and engages the docking plate to secure the baseplate thereto. The air compressor and the air storage tank are each secured to the second surface.

17 Claims, 4 Drawing Sheets

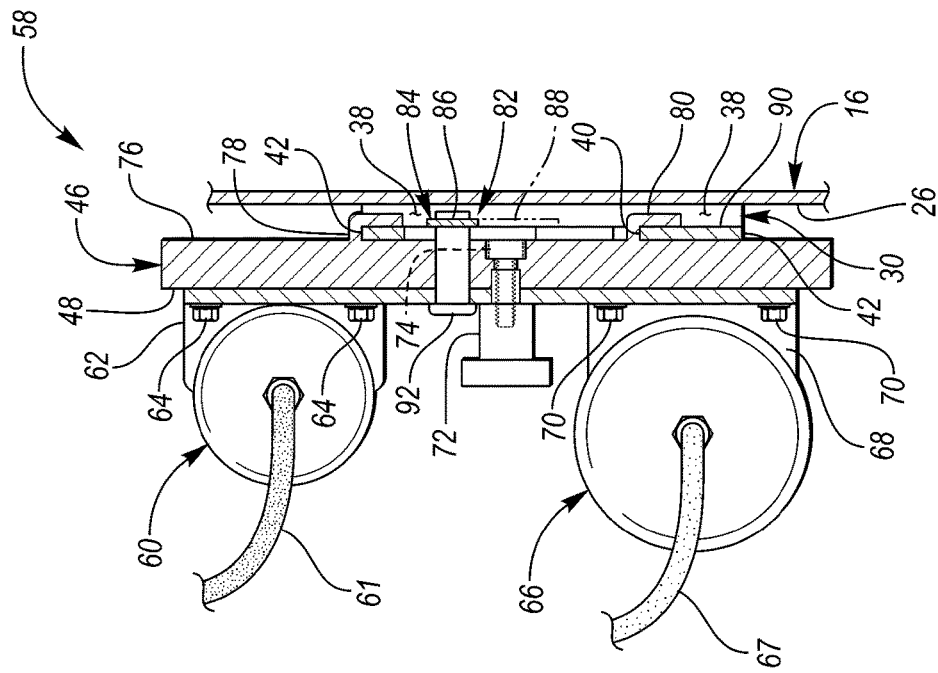
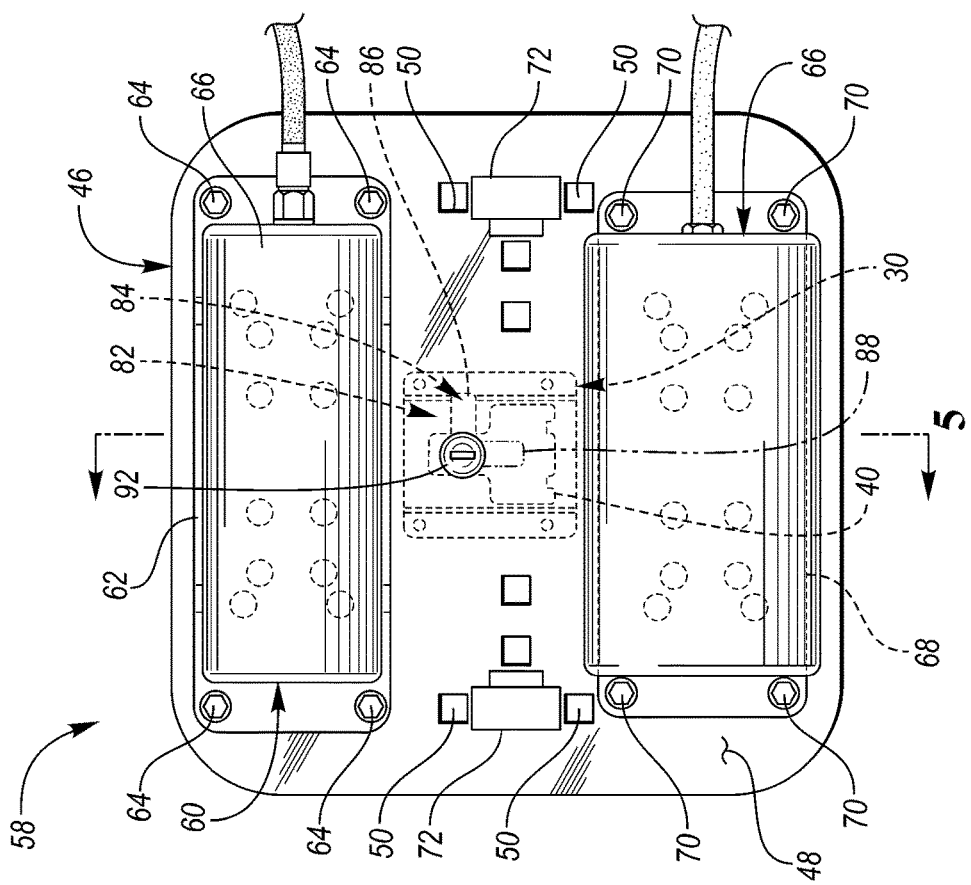

VEHICLE AND VEHICLE AIR COMPRESSOR SYSTEM

TECHNICAL FIELD

The present disclose relates to pickup trucks, pickup truck cargo beds that are configured to receive and store cargo being transported by pickup trucks, and pickup truck accessory devices.

BACKGROUND

Pickup trucks include cargo beds that are configured to received and store cargo being transported.

SUMMARY

A vehicle includes a truck bed, docking plate, baseplate, latching system, air compressor, and air storage tank. The truck bed has a side panel extending upward from a floor panel. The docking plate is secured to an internal surface of the side panel. The baseplate has first and second opposing external surfaces. The latching system extends from the first surface and engages the docking plate to secure the baseplate thereto. The air compressor and the air storage tank are each secured to the second surface.

An air compressor system includes a baseplate, latching system, air compressor, and air storage tank. The baseplate has forward and rearward facing external surfaces. The latching system extends from the rearward facing surface and is configured to engage a docking plate on a vehicle to secure the baseplate thereto. The air compressor is secured to the forward facing surface. The air storage tank is also secured to the forward facing surface.

An air compressor system includes a baseplate and a latching system. The baseplate has first and second external surfaces. The first surface defines a plurality of orifices that includes first and second subsets of orifices patterned to receive fasteners for respectively mounting a plurality of air compressor and air storage tank models having mounting footprints of varying dimensions. The latching system extends from the second surface and is configured to engage a vehicle docking plate to secure the baseplate thereto.

BRIEF DESCRIPTION OF THE DRAWINGS

FIG. 4 is front view of the air compressor system secured to the standard interface plate;

FIG. 5 is a cross-sectional view taken along line 5-5 in FIG. 4; and

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
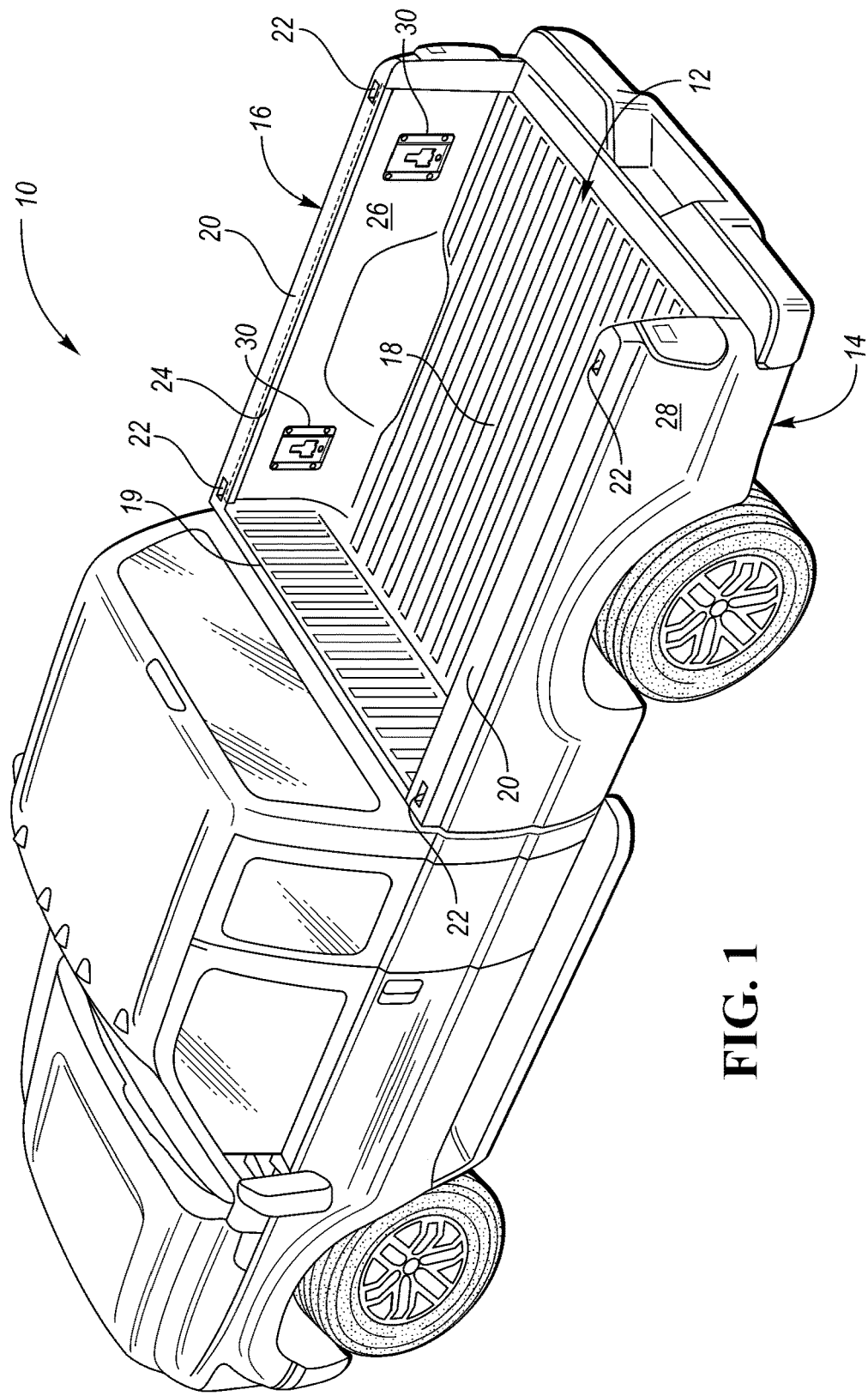
FIG. 1 is a perspective view of a vehicle having a cargo or truck bed.

Referring to FIG. 1, a vehicle 10 is illustrated. The vehicle 10 may be a truck that includes a cargo or truck bed 12. The truck bed 12 may include a first side panel 14 and a second side panel 16. The truck bed 12 may also include a truck bed floor 18 (which may also be referred to as a cargo bed floor or floor panel), a headboard panel 19, and a tailgate (not shown). The first side panel 14 and second side panel 16 may extend upward from the truck bed floor 18. The components of the truck bed 12, including the first side panel 14, second side panel 16, floor 18, headboard panel 19, and tailgate, may be made from a sheet metal material, including but not limited to, steel sheet or an aluminum alloy sheet. The first side panel 14 and second side panel 16 may have top surfaces 20 that define stake pockets 22. The stake pockets 22 are through holes that extend through the top surfaces 20. Portions of the first side panel 14 and second side panel 16 (which may be referred as overhangs 24) may extend away and then downward from the top surfaces 20 of the first and second side panels, towards the truck bed floor 18. The first and second side panels 14, 16 include internal side surfaces 26 that face towards the interior of the truck bed 12 and external side surfaces 28 that face towards the exterior of the truck bed 12. The internal side surfaces 26 of the first side panel 14 and second side panel 16 may be referred to as opposing internal surfaces of the first side panel 14 and second side panel 16.

It may be desirable to secure accessories at different locations within the cargo bed 12. A plurality of fixed plates 30 may be affixed at various locations of the truck bed 12 to provide a number of different securing points for various accessories. In at least one embodiment, standard-sized fixed plates 30 are provided at several locations on one or more of the truck bed floor panel 18, first side panel 14, second side panel 16, headboard panel 19, and tailgate. In the depicted embodiment, two standard-sized fixed plates 30 are affixed to the internal side surface 26 of the first side panel 14 between the top surface 20 of the first side panel 14 and the truck bed floor 18. The depicted embodiment also includes two additional standard-sized fixed plates 30 that are affixed to the internal side surface 26 of the second side panel 16 between the top surface 20 of the second side panel 16 and the truck bed floor 18. In alternative embodiments, the fixed plate 30 may be an elongate track having a number of different secure points along its length.

Figure 2:
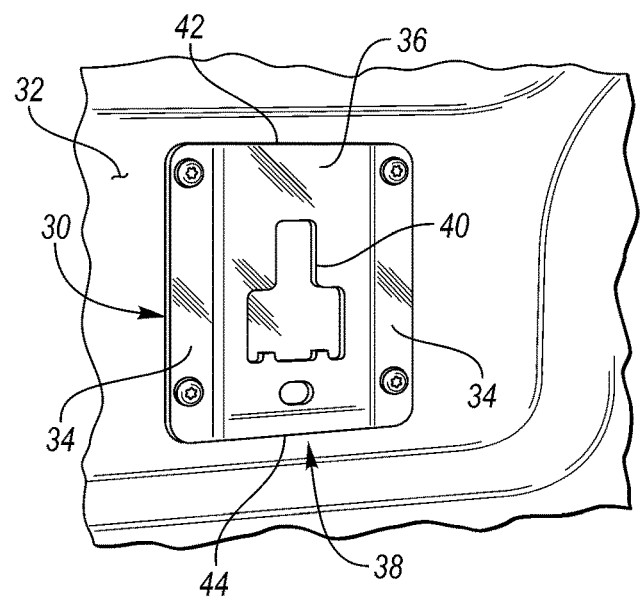
FIG. 2 is a perspective view of a standard interface plate.

Referring to FIG. 2, an example of a standard-sized fixed interface plate 30 is depicted. The standard-sized fixed plate 30 may alternatively be referred to as a docking plate. As discussed above, each of a number of fixed plates may define standard dimensions to accommodate modular connections using interchangeable components. In the example of FIG. 2, the fixed plate 30 is secured to a vertical wall 32, for example such as the internal side surfaces 26 of the first side panel 14 or second side panel 16. The fixed plate 30 includes a pair of opposing mounting flanges 34 that are secured to the vertical wall 32. An offset section 36 is provided between, and interconnects the opposing mounting flanges 34. The offset section 36 may also be referred to as the protruding middle section. The offset section 36 is positioned at a distance away from the vertical wall 32 to provide a gap 38. More specifically, the gap 38 may be defined by the offset section 36 of the fixed plate 30 spatially between the offset section 36 and the internal side surface 26 of the respective side panel that the fixed plate 30 is attached to, whether it be the first side panel 14 or second side panel 16. In this way, a number of different devices can be mechanically retained to the offset section 36 by extending into the gap 38 and engaging a back surface of the offset section 36. In one example, a hole (or keyway) 40 is provided near a center portion of the offset section. The hole 40 may be shaped to receive a locking feature from an interfacing component to retain to the fixed plate 30. The hole (or keyway) 40 may access the gap 38 defined by the offset section 36. In other examples, an interfacing component may be secured to an upper edge 42 and/or a lower edge 44 of the fixed plate 30.

Figure 3:
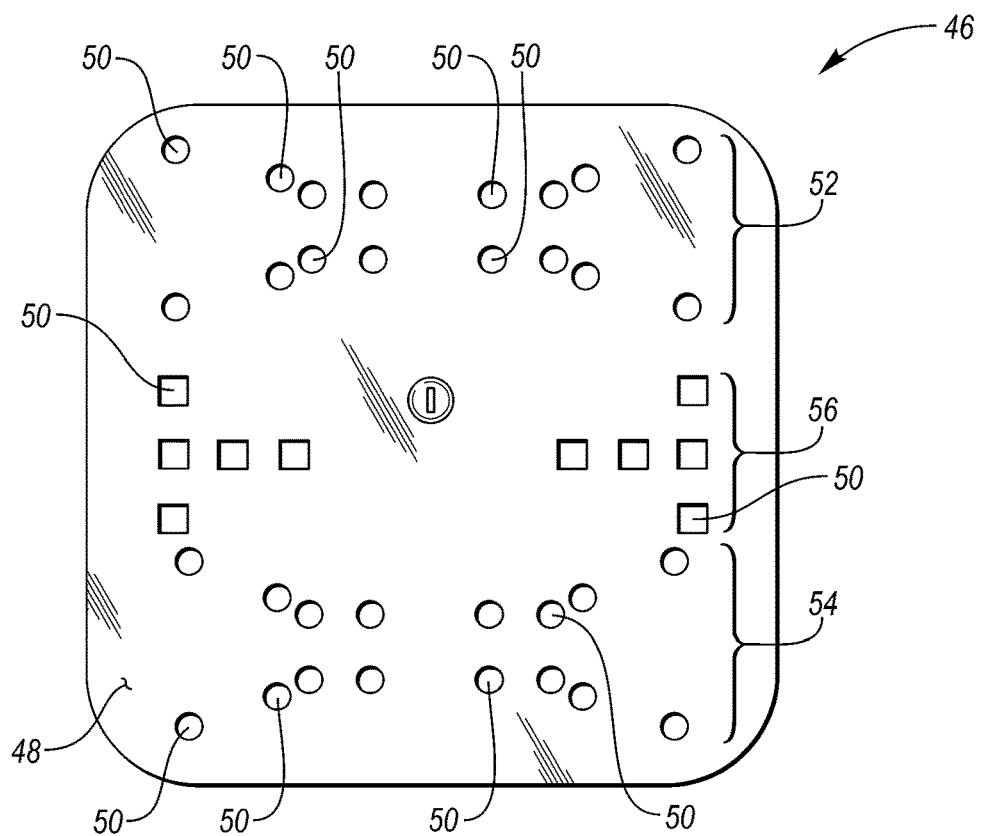
FIG. 3 is a front view of a baseplate of an air compressor system.

Referring to FIG. 3, a front view of a baseplate 46 of an air compressor system is illustrated. The baseplate 46 includes a front (or forward facing) external surface 48 that defines a plurality of orifices 50. The plurality of orifices 50 may include a first subset of orifices 52 patterned to receive fasteners for mounting a plurality of air compressor models having mounting footprints of varying dimensions. For Example, each set of four orifices of the first subset of orifices 52 that forms a rectangle that is symmetrically distributed along the right and left hand sides of the front external surface 48 of the baseplate 46 may be configured to receive fasteners to mount a particular air compressor model. The plurality of orifices 50 may include a second subset of orifices 54 patterned to receive fasteners for mounting a plurality of air storage tank models having mounting footprints of varying dimensions. For Example, each set of four orifices of the second subset of orifices 54 that forms a rectangle that is symmetrically distributed along the right and left hand sides of the front external surface 48 of the baseplate 46 may be configured to receive fasteners to mount a particular air storage tank model. The plurality of orifices 50 may include a third subset of orifices 56 patterned to receive fasteners for mounting hose wrapping brackets.

The plurality of orifices 50 could be tapped holes configured to receive threaded portions of a fastener or through holes configured to interact with a nut and bolt combination or other types of fasteners, such as rivets. Alternatively, the plurality of orifices 50 could be counter-sunk or counter-bore holes that define recessed areas configured to receive the heads of fasteners that are utilized for mounting the air compressors, air storage tanks, and/or hose wrapping brackets to the baseplate 46. The counter-sunk or counter-bore portion of the orifices may be defined by the front external surface 48 of the baseplate 46 or a rear (or rearward facing) external surface (not shown in FIG. 3) of the baseplate 46, depending on whether design parameters require the fasteners to approach the baseplate 46 from the front side or rear side of the baseplate 46. The front external surface 48 of the baseplate 46 and the rear external surface of the baseplate 46 may be respectively referred to as first and second opposing external surfaces or vice versa. The plurality of orifices may include portions that are non-circular and function as keyways that engage keyed protrusions to prevent any element that is secured to the baseplate 46 by a single fastener from rotating. For example, a single hose wrapping bracket may include a keyed protrusion that engages one of the third subset of orifices 56 (shown as square-shaped when viewed from the front external surface 48).

Referring to FIGS. 4 and 5, a front view of an air compressor system 58 that is secured to the fixed plate 30 and a cross-sectional view taken along line 5-5 in FIG. 4 are, respectively, illustrated. The air compressor system 58 includes an air compressor 60 that is secured to front external surface 48 of the baseplate 46. The air compressor 60 is not shown as a cross-section in FIG. 5 for simplification purposes. The air compressor may include an electrical power cord 61 that may be connected directly to an electrical component (e.g., a battery) of the vehicle 10 or may be connected to an electrical component of the vehicle via an AC or DC adaptor. The air compressor 60 may be secured to a cradle or bracket 62 which in turn is secured to the front external surface 48 of the baseplate 46 by a first set of fasteners 64. More specifically, the first set of fasteners 64 may include four fasteners that engage four of the first subset of orifices 52. The cradle or bracket 62 may be integral to the air compressor 60 or may be a separate component. The first set of 64 fasteners are shown to include threaded portions that engage tapped holes defined by the baseplate 46. However, it should be understood that the fastener and orifice configuration could be any other configuration described above or known to a person of ordinary skill in the art.

The air compressor system 58 includes an air storage tank 66 that is secured to the front external surface 48 of the baseplate 46. The air storage tank 66 is not shown as a cross-section in FIG. 5 for simplification purposes. Pneumatic hosing, pipes, fittings, etc. (not shown) may fluidly connected the air storage tank 66 to the air compressor 60, so that air compressor 60 may deliver air to and compress the air within the air storage tank 66. An air outlet tube 67 may extend from the air storage tank 66 or may be pluggable into an outlet fixture that is fluidly connected to the air storage tank. The air outlet tube may be configured to receive fittings such as nozzles, connectors, etc. The air storage tank 66 may be secured to a cradle or bracket 68 which in turn is secured to the front external surface 48 of the baseplate 46 by a second set of fasteners 70. More specifically, the second set of fasteners 70 may include four fasteners that engage four of the second subset of orifices 54. The cradle or bracket 68 may be integral to the air storage tank 66 or may be a separate component. The second set of 70 fasteners are shown to include threaded portions that engage tapped holes defined by the baseplate 46. However, it should be understood that the fastener and orifice configuration could be any other configuration described above or known to a person of ordinary skill in the art.

The air compressor system 58 includes a pair of hose wrapping brackets 72 that are secured to the front external surface 48 of the baseplate 46. The hose wrapping brackets 72 may be L-shaped brackets that each face outward. The hose wrapping brackets may be utilized for storing the air outlet tube 67 when not in use. The hose wrapping brackets 72 may each include a keyed protrusion that engages one of the third subset of orifices 56 from the front external surface 48 of the baseplate 46. A third set of fasteners 74 may extend from the rear external surface 76 of the baseplate 46, through counter-sunk orifices in the baseplate 46, and engage tapped orifices in the hose wrapping brackets 72. Although it is shown that the wrapping brackets 72 are secured to the front external surface 48 external surface of the baseplate 46 via fasteners engaging counter-sunk holes in the baseplate 46 and tapped holes in the wrapping brackets 72, it should be understood that the fastener and orifice configuration could be any other configuration described above or known to a person of ordinary skill in the art.

The baseplate 46 may include a first hanger 78 that extends from the rear external surface 76 of the baseplate 46 and over the upper edge 42 of the fixed plate 30 and downward into the gap 38 defined by the offset section 36 of the fixed plate 30 in order to assist in securing the baseplate 46 to the fixed plate 30. The baseplate 46 may also include a second hanger 80 that extends from the rear external surface 76 of the baseplate 46 and over an edge of the hole (or keyway) 40 and into the gap 38 defined by the offset section 36 of the fixed plate 30 in order to assist in securing the baseplate 46 to the fixed plate 30. Alternatively, the baseplate 46 may simply include a protrusion that extends into the gap 38 via the hole (or keyway) 40 and engages the fixed plate 30.

The baseplate 46 may also include a latching mechanism 82 that extends from the rear external surface 76 of the baseplate 46 and engages the fixed plate 30 to secure the baseplate 46 to the fixed plate 30. The latching mechanism 82 extends through the hole (or keyway) 40 and into the gap 38 defined by the offset section 36 of the fixed plate 30. More specifically, the latching mechanism 82 may include a latching arm 84 that is configured to transition between a locked position 86 and an unlocked position 88. The latching arm 84 may engage a rear surface 90 of the offset section 36 of the fixed plate 30 within the gap 38 in order to secure the baseplate 46 to the fixed plate 30. The latching mechanism 82 may also include a tumbler 92 that includes a keyhole that is configured to receive a key in order to lock or unlock the baseplate 46 to the fixed plate 30. The latching arm 84 may be secured to and extend radially outward from the tumbler 92.

Figure 6:
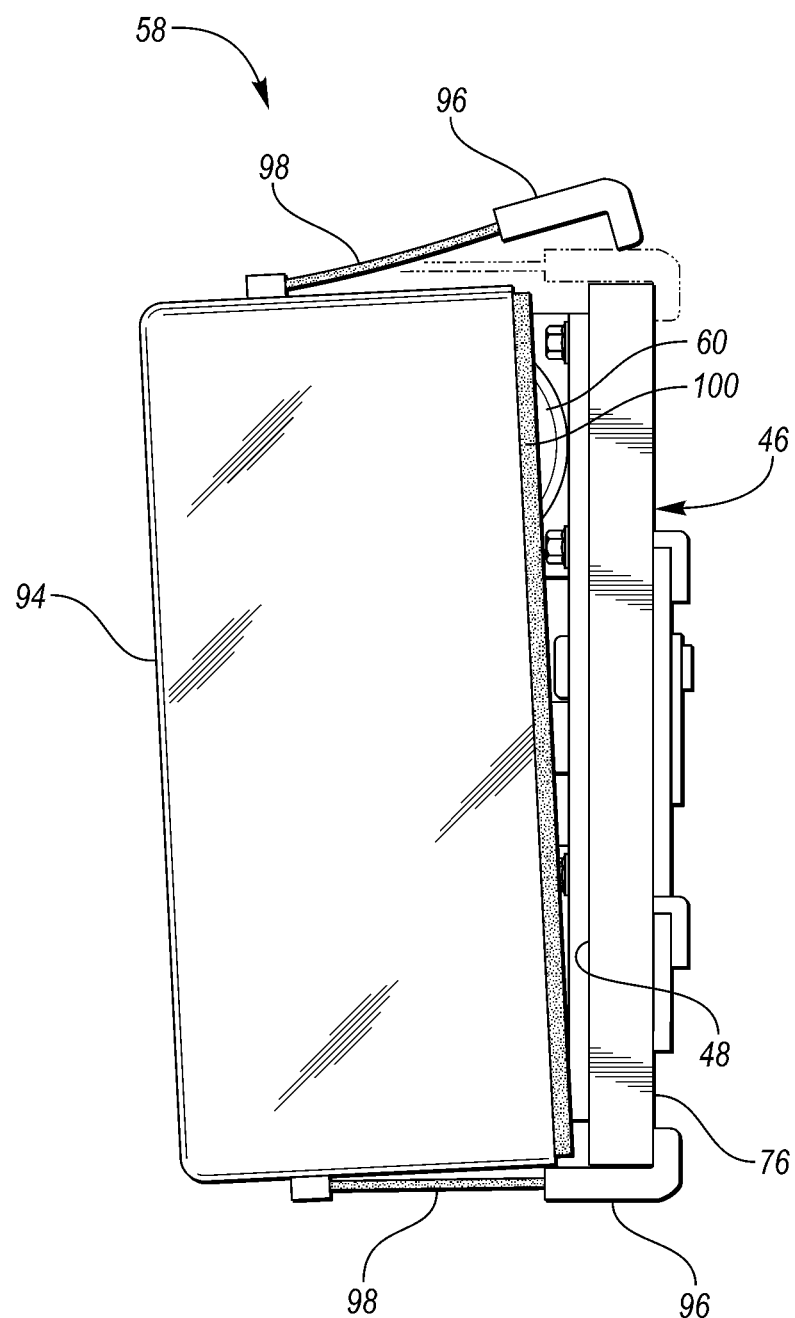
FIG. 6 is a side view of the air compressor system having a cover secured thereto.

Referring to FIG. 6, a side view of the air compressor system 58 having a cover 94 secured thereto is illustrated. The cover 94 includes hooks 96 that engage the rear external surface 76 of the baseplate 46. The hooks 96 are connected to the cover 94 via elastic straps 98 to ensure that the cover is secured to the baseplate 46 and fully encloses the air compressor 60 and the air storage tank 66. The cover 94 may include a seal 100, such as a rubber seal, that engages the front external surface 48 of the baseplate 46 to protect the components of the air compressor system 58, such as the air compressor 60, air storage tank 66, hose wrapping brackets 72, and any of the other components, from external weather conditions such as rain or snow. Plugs may also be place within any of the unused orifices of the plurality of orifices 50 to protect the components of the air compressor system 58 from external weather conditions.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a truck bed having a side panel extending upward from a floor panel;
    a docking plate secured to an internal surface of the side panel and having a protruding middle section that defines a gap between the docking plate and the internal surface of the side panel;
    a baseplate having first and second opposing externals surfaces, the second surface of the baseplate defining a plurality of orifices that includes a first subset of orifices patterned to receive fasteners for mounting a plurality of air compressor models having mounting footprints of varying dimensions, a second subset of orifices patterned to receive fasteners for mounting a plurality of air storage tank models having, mounting footprints of varying dimensions, and a third subset of orifices patterned to receive fasteners for mounting hose wrapping brackets;
    a latching system extending from the first surface and engaging the docking plate to secure the baseplate thereto; and
    an air compressor and an air storage tank, each secured to the second surface.

2. The vehicle of claim 1, wherein the air compressor is secured to the second surface via fasteners engaging four orifices of the first subset of orifices.

3. The vehicle of claim 1, wherein the air storage tank is secured to the second surface via fasteners engaging four orifices of the second subset of orifices.

4. The vehicle of claim 1, further comprising a pair of hose wrapping brackets, and wherein each of the pair is secured to the second surface via fasteners engaging the third subset of orifices.

5. The vehicle of claim 1, wherein the middle section of the docking plate defines a keyway that accesses the gap, the latching system includes a latching arm that extends through the keyway, into the gap, and engages the docking plate within the gap to secure the baseplate to the docking plate.

6. The vehicle of claim 5, wherein the latching system includes a tumbler and the latching arm is secured to the tumbler.

7. An air compressor system comprising:
    a baseplate having forward and rearward facing external surfaces, the forward facing surface defining a plurality of orifices that includes a first subset of orifices patterned to receive fasteners for mounting a plurality of air compressor models having mounting footprints of varying dimensions, a second subset of orifices patterned to receive fasteners for mounting a plurality of air storage tank models having mounting footprints of varying dimensions, and a third subset of orifices patterned to receive fasteners for mounting hose wrapping brackets;
    a latching system extending from the rearward facing surface, having a tumbler and a latching arm extending radially outward therefrom, and configured to engage a docking plate on a vehicle to secure the baseplate thereto;
    an air compressor secured to the forward facing surface; and
    an air storage tank secured to the forward facing surface.

8. The system of claim 7, wherein the air compressor is secured to the forward facing surface via fasteners engaging four orifices of the first subset of orifices.

9. The system of claim 7, wherein the air storage tank is secured to the forward facing surface via fasteners engaging four orifices of the second subset of orifices.

10. The system of claim 7 further comprising a pair of hose wrapping brackets, and wherein each of the pair is secured to the forward facing surface via fasteners engaging the third subset of orifices.

11. An air compressor system comprising:
a baseplate having first and second external surfaces, the first surface defining a plurality of orifices that includes first, second, and third subsets of orifices patterned to receive fasteners for respectively mounting a plurality of air compressors, air storage tank models having mounting footprints of varying dimensions, and hose wrapping brackets; and
a latching system extending from the second surface, having a tumbler and a latching arm extending radially outward therefrom, and configured to engage a vehicle docking plate to secure the baseplate thereto.

12. The system of claim 11 further comprising, a pair of hose wrapping brackets.

13. The system of claim 12, wherein each of the pair of hose wrapping brackets is secured to the first surface via fasteners engaging the third subset of orifices.

14. The system of claim 11 further comprising an air compressor secured to the second external surface.

15. The system of claim 14, wherein the air compressor is secured to the second external surface is fasteners engaging orifices of the first subset of orifices.

16. The system of claim 11 further comprising an air storage tank secured to the second external surface.

17. The system of claim 16, wherein the air storage is secured to the second external surface via fasteners engaging orifices of the second subset of orifices.

* * * * *